(12) United States Patent
Parulski

(10) Patent No.: US 12,177,563 B2
(45) Date of Patent: Dec. 24, 2024

(54) IMAGE CAPTURE DEVICE HAVING AN EVENT MODE AND METHOD THEREOF

(71) Applicant: Kenneth A Parulski, Rochester, NY (US)

(72) Inventor: Kenneth A Parulski, Rochester, NY (US)

(73) Assignee: AKAP INNOVATION, LLC, Rochester, NY (US)

(\*) Notice: Subject to any disclaimer, the term of this patent is extended or adjusted under 35 U.S.C. 154(b) by 120 days.

(21) Appl. No.: 18/091,795

(22) Filed: Dec. 30, 2022

(65) Prior Publication Data
US 2024/0223894 A1 Jul. 4, 2024

(51) Int. Cl.
*H04N 23/667* (2023.01)
*H04N 23/63* (2023.01)

(52) U.S. Cl.
CPC ......... *H04N 23/667* (2023.01); *H04N 23/631* (2023.01)

(58) Field of Classification Search
CPC ............................ H04N 23/667; H04N 23/631
See application file for complete search history.

(56) References Cited

U.S. PATENT DOCUMENTS

| | | |
|---|---|---|
| 5,138,454 A | 8/1992 | Parulski |
| 5,410,415 A | 4/1995 | Parulski et al. |
| 5,900,909 A | 5/1999 | Parulski et al. |
| 6,262,769 B1 | 7/2001 | Anderson et al. |
| 7,643,704 B2 | 1/2010 | Jackson et al. |
| 2009/0027510 A1 | 1/2009 | Yumiki |
| 2011/0221914 A1 | 9/2011 | Shinbo et al. |
| 2014/0320715 A1 | 10/2014 | Haji-Khamneh et al. |
| 2016/0295124 A1* | 10/2016 | Brauer .................. G06F 3/0346 |
| 2017/0161914 A1* | 6/2017 | Ding ...................... H04N 23/64 |
| 2019/0373187 A1* | 12/2019 | Chhuor ................. G06F 3/0412 |

(Continued)

OTHER PUBLICATIONS

Pro Camera—Omnipotent Camera developed by Xiamen Suijisenlin; described at the following site: https://apps.apple.com/us/app/pro-camera-omnipotent-camera/id1224581974. (Screen shots taken from website. Total of 5 pages) Alternate site: https://appgrooves.com/ios/1224581974/pro-camera-omnipotent-camera/xiamen-suijisenlin-technology-co-ltd.

(Continued)

*Primary Examiner* — Padma Haliyur
(74) *Attorney, Agent, or Firm* — Susan L. Parulski

(57) ABSTRACT

An image capture device configured to record a digital image. The capture device includes a body having an imaging component and an orientation sensor, wherein the body is orientable by a user between at least a horizontal orientation and a vertical orientation. The device further includes a processor coupled to the orientation sensor to determine the orientation of the body, and activating the imaging component to record the digital image (a) in a landscape aspect ratio when the body is determined to be in the horizontal orientation and (b) in a portrait aspect ratio when the body is determined to be in the vertical orientation. A user interface includes an event mode that, when selected by the user, instructs the processor to activate the imaging component to record the digital image in a landscape aspect ratio when the body is determined to be in the vertical orientation.

20 Claims, 11 Drawing Sheets

(56) References Cited

U.S. PATENT DOCUMENTS

| | | | |
|---|---|---|---|
| 2022/0191400 A1* | 6/2022 | Wada | H04N 23/683 |
| 2022/0201224 A1* | 6/2022 | Siu | H04N 23/6812 |
| 2023/0056104 A1* | 2/2023 | McRae | G08B 13/196 |
| 2023/0254574 A1* | 8/2023 | Desai | H04N 23/611 |
| | | | 382/103 |
| 2024/0089613 A1* | 3/2024 | Siu | H04N 23/54 |

OTHER PUBLICATIONS

Multiple Object Tracking Using Yolo-Based Detector by Lin et al., Journal of Imaging Science & Technology, Jul.-Aug. 2021, 65(4): 040401-1 thru 040401-9, 2021. (Total of 9 pages).

Face Detection and Recognition in Organic Video: a Comparative Study for Sport Celebrities Database by Akbay et al., IS&T International Symposium on Electronic Imaging 2022; Image Processing: Algorithms and Systems XX; 10.2352/EI.2022.34.10.IPAS-355; pp. 355-1 thru 355-6. (Total of 6 pages).

Omnivision OV50E, Ordering Information, OV50E40-GA5A-4A-Z (color chip probing, 150um backgrinding, reconstructed wafer with good die) (Total of 1 page).

Bosch Data Sheet for Bosch BMI160 "Small, Low Power Inertial Measurement Unit" available from Bosch Sensortec GmbH, Reutlingen. Germany. (Total of 4 pages).

\* cited by examiner

US 12,177,563 B2

IMAGE CAPTURE DEVICE HAVING AN EVENT MODE AND METHOD THEREOF

TECHNICAL FIELD

The present disclosure relates to capturing digital images, including using image capture devices having a selectable capture image aspect ratio. Some embodiments of the present disclosure relate to image capture devices which include a selectable capture mode to capture and record landscape aspect ratio images when the device is held in a vertical orientation, instead of capturing and recording portrait aspect ratio images.

BACKGROUND

Orientation sensors are included in some image capture devices, including smartphone cameras, so that images captured—either when the camera is orientated horizontally (to capture landscape aspect ratio images) or vertically (to capture portrait aspect ratio images)—will be recorded in the desired arrangement/orientation for proper display, for example, with the proper side up (e.g., the sky will be located at the top of the display). This concept is described in U.S. Pat. No. 5,900,909 (Parulski et al), entitled "ELECTRONIC STILL CAMERA HAVING AUTOMATIC ORIENTATION SENSING AND IMAGE CORRECTION", incorporated herein by reference in its entirety.

For example, prior art FIG. 1A illustrates a smartphone 20 having a body which includes a camera and a display. As shown in FIG. 1A, smartphone 20 is disposed in a horizontal orientation. When smartphone 20 captures a video (or image) of scene 10A while the body is held so that the longer side of the smartphone's display is oriented in a horizontal direction 32, the smartphone 20 records landscape (e.g., 16:9 widescreen) aspect ratio video images 22 of scene 10A.

In contrast to FIG. 1A, as depicted in prior art FIG. 1B, smartphone 20 is disposed in a vertical orientation. When the body of the smartphone 20 is held so that the longer side of the smartphone's display is oriented in a vertical direction 34, the smartphone 20 records portrait (e.g., 9:16 narrow screen) aspect ratio video images 24 of scene 10A.

A problem can arise when users attempt to record images of events from their position in the audience—especially at events such as concerts, performances, school plays, or other events having a large audience or stage presence or occurring at a large venue. Such a situation is depicted in prior art FIG. 1C, where smartphone 20 records a video of event scene 10B. At such events, it is common for the user's arm/hand 12 to be held high above other audience members (in order to capture and record images of the event) while the smartphone's body is being held so that the longer side of the device and display is oriented in the vertical direction 34. Unfortunately, this means that portrait (e.g., narrow screen) aspect ratio video images 24 of scene 10B are captured and recorded, as depicted earlier in FIG. 1B. Often, the user would prefer to capture landscape (e.g., widescreen) aspect ratio images of the event in order to match the image aspect ratio of flat panel television displays and computer displays, but it is more difficult for the user to hold and control the smartphone's body in a high horizontal orientation in such situations. Still referring to FIG. 1C, because smartphone 20 is oriented vertically, recorded video images 24 have a portrait (e.g., narrow screen) aspect ratio which typically contains an extensive area of the crowd, ceiling, or sky. Moreover, as shown in prior art FIG. 1D, when the portrait aspect ratio video recording 24 is displayed using a conventional wide screen computer display monitor 40 which has the longer side of the display oriented in a horizontal direction 32, or using a conventional flat screen television (not shown), only the small portion in the center of the monitor 40 is used to display the portrait aspect ratio video recording 24. The left and right sides 42, 44 of monitor 40 are not used to display the portrait aspect ratio video recording 24 of scene 10B.

SUMMARY

The present disclosure describes a digital image capture device configured to record a digital image. The capture device includes a body having an imaging component and an orientation sensor, wherein the body is orientable by a user between at least a horizontal orientation and a vertical orientation. The capture device further includes a processor coupled to the orientation sensor to determine the orientation of the body, and activating the imaging component to record the digital image (a) in a landscape aspect ratio when the body is determined to be in the horizontal orientation and (b) in a portrait aspect ratio when the body is determined to be in the vertical orientation. A user interface of the capture device is coupled to the processor. The user interface includes an event mode that, when selected by the user, instructs the processor to activate the imaging component to record the digital image in a landscape aspect ratio when the body is determined to be in the vertical orientation.

The present disclosure describes a digital image capture device configured to record a digital image. The capture device includes: (a) a body having an imaging component and an orientation sensor to determine an orientation of the body, the body being orientable by a user between at least a horizontal orientation and a vertical orientation; (b) a processor coupled to the imaging component and the orientation sensor; and (c) a user interface coupled to the processor and having: (i) a first mode that activates the imaging component to record the digital image (a) in a landscape aspect ratio when the body is determined to be in the horizontal orientation and (b) in a portrait aspect ratio when the body is determined to be in the vertical orientation; and (ii) a second mode that activates the imaging component to record the digital image in a landscape aspect ratio when the body is determined to be in the vertical orientation.

The present disclosure describes a method of recording a digital image using an image capture device, wherein the image capture device includes a body and a processor coupled to an imaging component and an orientation sensor, the body being orientable by a user between at least a horizontal orientation and a vertical orientation. The method comprises: (1) providing a user interface coupled to the processor having a user-selectable first mode and second mode; (2) using the orientation sensor, determining the orientation of the body; (3) responsive to the user selecting the first mode, instructing the imaging component to record the digital image (a) in a landscape aspect ratio when the body is determined to be in the horizontal orientation and (b) in a portrait aspect ratio when the body is determined to be in the vertical orientation; and (4) responsive to the user selecting the second mode, instructing the imaging component to record the digital image in a landscape aspect ratio when the body is determined to be in the vertical orientation.

The present disclosure describes a tangible storage medium for storing instructions readable by a processor in an image capture device having a body and a processor coupled to an imaging component, an orientation sensor, and a touch screen display, the body being orientable by a user between at least a horizontal orientation and a vertical orientation, which when executed by the processor enables the image capture device to: (a) provide a user interface on the touch screen display having a user-selectable first mode and second mode; (b) use the orientation sensor to determine the orientation of the body; (c) responsive to the user selecting the first mode, instruct the imaging component to record the digital image (a) in a landscape aspect ratio when the body is determined to be in the horizontal orientation and (b) in a portrait aspect ratio when the body is determined to be in the vertical orientation; and (d) responsive to the user selecting the second mode, instruct the imaging component to record the digital image in a landscape aspect ratio when the body is determined to be in the vertical orientation.

BRIEF DESCRIPTION OF THE DRAWINGS

It is to be understood that the attached drawings are for purposes of illustrating aspects of various embodiments and may include elements that are not to scale.

DETAILED DESCRIPTION

In the following description, some embodiments of the present invention are described in terms that may be implemented at least in part as one or more software programs configured to be executed by a data processing device system, such as a smartphone. Some or all of such software programs may be equivalently constructed in hardware. Software and hardware not specifically shown, suggested, or described herein that is useful for implementation of any of various embodiments of the present invention are conventional and within the ordinary skill of the art.

In this regard, in the descriptions herein, certain specific details are set forth in order to provide a thorough understanding of various embodiments of the invention. However, one skilled in the art will understand that the invention may be practiced at a more general level without these details. In other instances, well-known structures have not been shown or described in detail to avoid unnecessarily obscuring descriptions of various embodiments of the invention.

Figure 2:
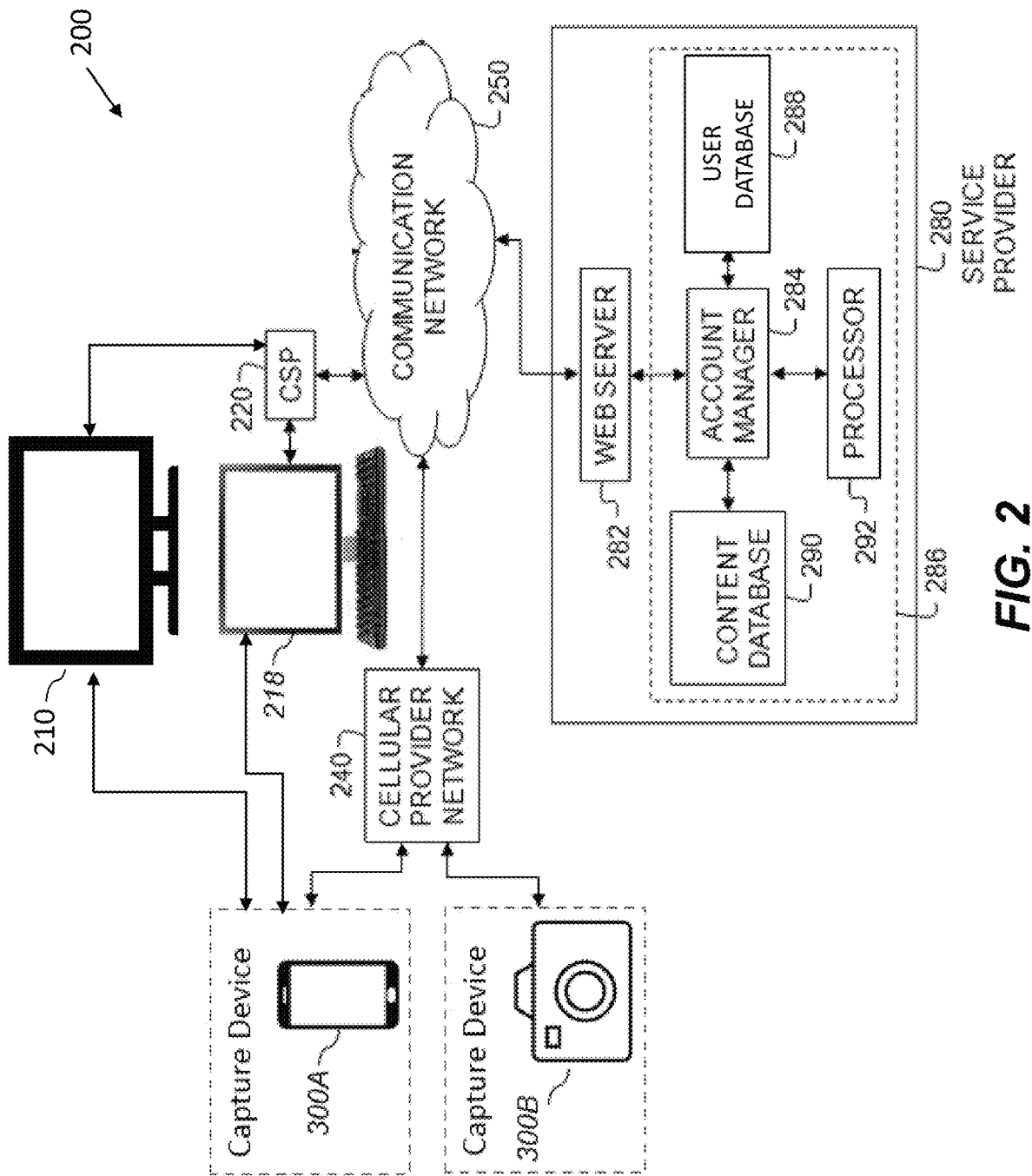
FIG. 2 illustrates an exemplary system which uses event mode capture devices.

FIG. 2 is a block diagram of an exemplary system 200 which uses digital images provided by a handheld digital image capture devices which include an event mode in accordance with the present application. As used herein the phrase digital images includes digital video images and digital still photographs. As used herein the phrase handheld digital image capture devices (hereinafter, also referred to as capture devices) refers to portable, battery-operated devices which capture digital images, including smartphones, tablets, digital cameras, camcorders, and the like.

As illustrated in FIG. 2, capture devices, such as a smartphone 300A and a digital camera 300B are communicatively connected with a service provider 280 using a cellular network 240, such as a cellular provider network. Cellular network 240 provides both voice and data communications using transmission devices located at cell towers throughout a region. Cellular network 240 is communicatively connected to a communication network 250, such as the Internet. It will be understood that system 200 typically can include many other capture devices, in addition to smartphone 300A and digital camera 300B. It will also be understood that system 200 can include a plurality of cellular networks 240, for example networks provided by companies such as VERIZON, AT&T, and T-MOBILE, which can be communicatively connected to communication network 250.

System 200 can also include one or more flat panel televisions, monitors, or displays 210 and computers 218, which are communicatively connected to capture device 300A or capture device 300B and which also communicate with cellular network 240, communication network 250, and service provider 280 via a communication service provider (CSP) 220.

Communication network 250 enables communication with service provider 280, such as YouTube. Service provider 280 includes a web server 282 for interfacing with communication network 250. It will be understood that system 200 can include a plurality of service providers 280, which can each provide different services and can support different regions of the world. In addition to interfacing with communications network 250, web server 282 can be configured to transfer digital images, such as digital videos, to and from a computer system 286 which manages digital images and data associated with various users/customers.

As illustrated in FIG. 2, computer system 286 includes an account manager 284, which operates software to permit the creation and management of individual user accounts, which are stored in a customer database 288. Account manager 284 permits the uploading and viewing of digital images by one or more authorized customers (also referred to as users). In some embodiments, customer database 288 can also store user profiles for at least some of the users, for example, personal information such as the user's nickname, full name and address, demographic information, and interests. In some embodiments, the user profiles stored in customer database 288 can also include billing information such as credit card information.

Figure 3A:
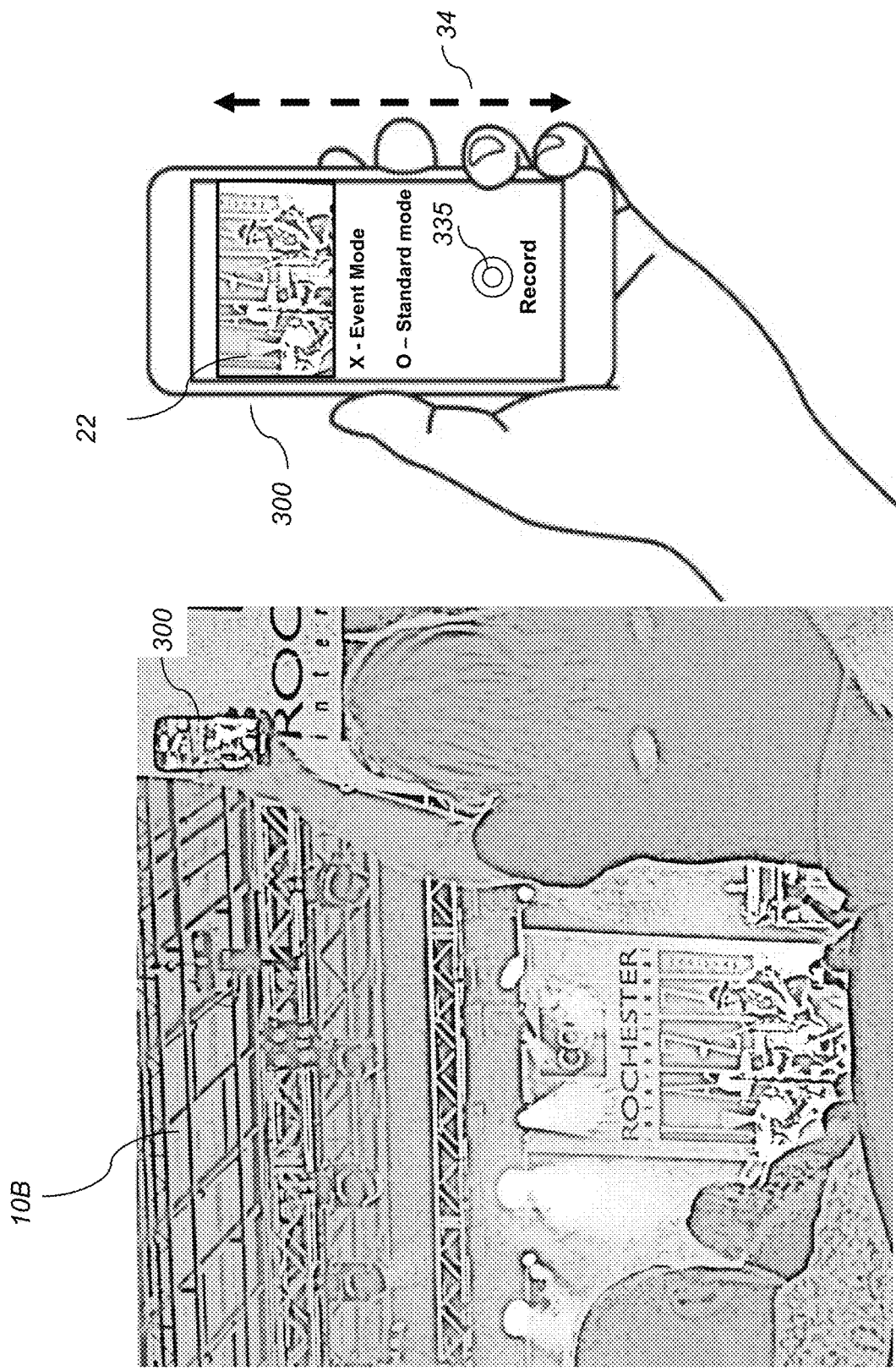
FIG. 3A illustrates an exemplary smartphone in accordance with the present application in a vertical orientation recording landscape aspect ratio video images of a concert scene using an event capture mode.

Referring now to FIG. 3A, this figure depicts an exemplary smartphone 300 in a vertical orientation 34 whereby landscape aspect ratio video images 22 of a concert scene are recorded using an operating mode herein referred to by Applicant as an "Event Mode" or "event mode" for ease of illustrating the present disclosure.

Those skilled in the art will recognize that other titles or descriptions (other than Event Mode) can be employed for the mode/function described herein. These include, for example: concert view; Concert View Mode; Concert Focus Mode; Stage Viewing; Stage Focusing; Stage Presence; CaptureMyEvent; IWantLandscape; Wide View; IWantWideScreen; and the like.

Figure 1B:
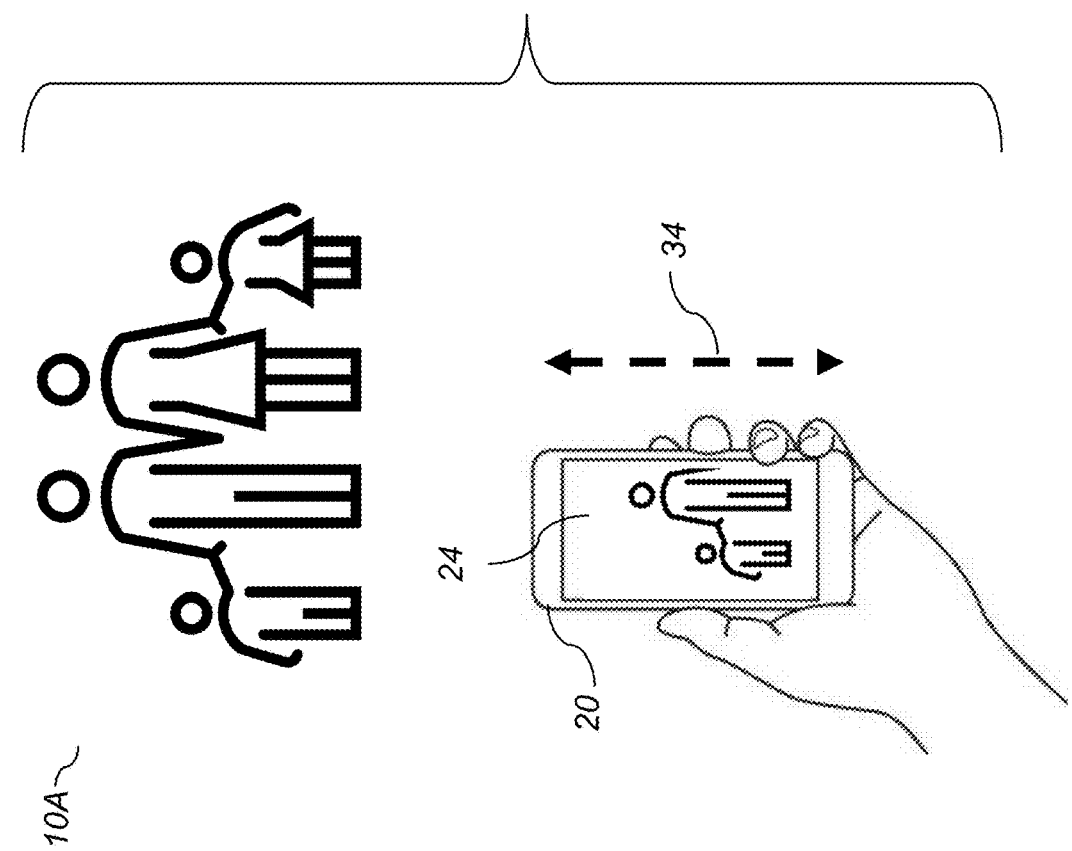
FIG. 1B illustrates a prior art smartphone in a vertical orientation recording portrait video images.
Figure 1A:
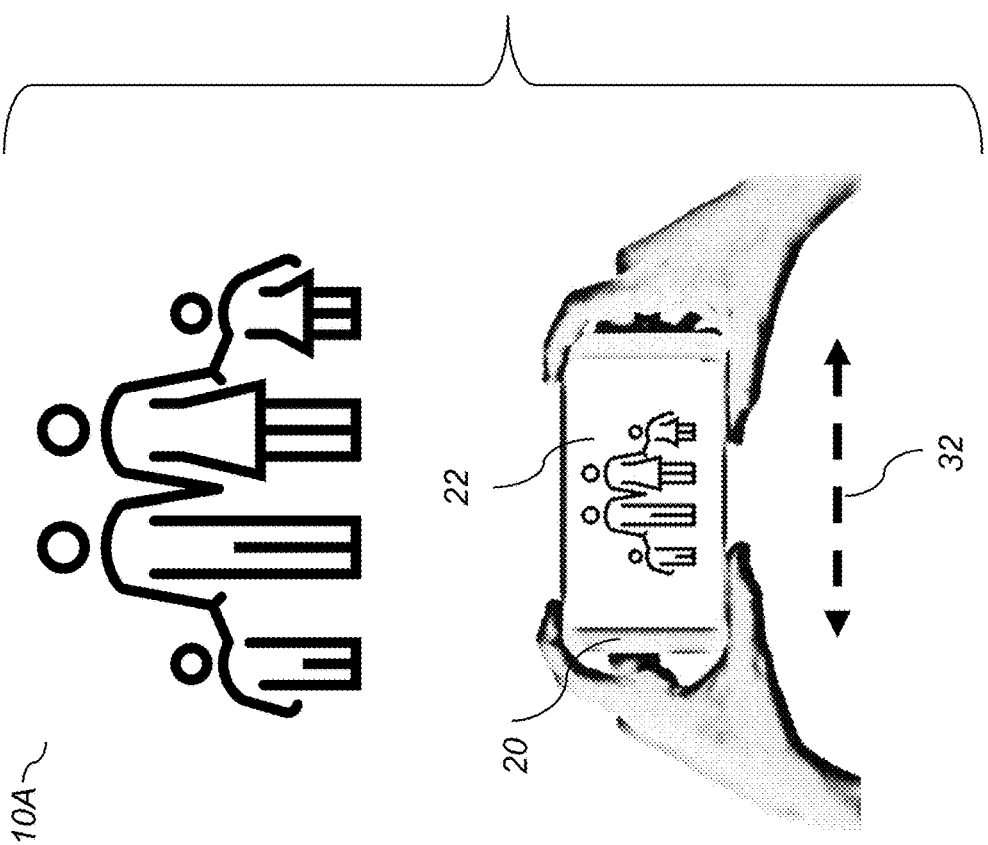
FIG. 1A illustrates a prior art smartphone in a horizontal orientation recording landscape aspect ratio video images.
Figure 1C:
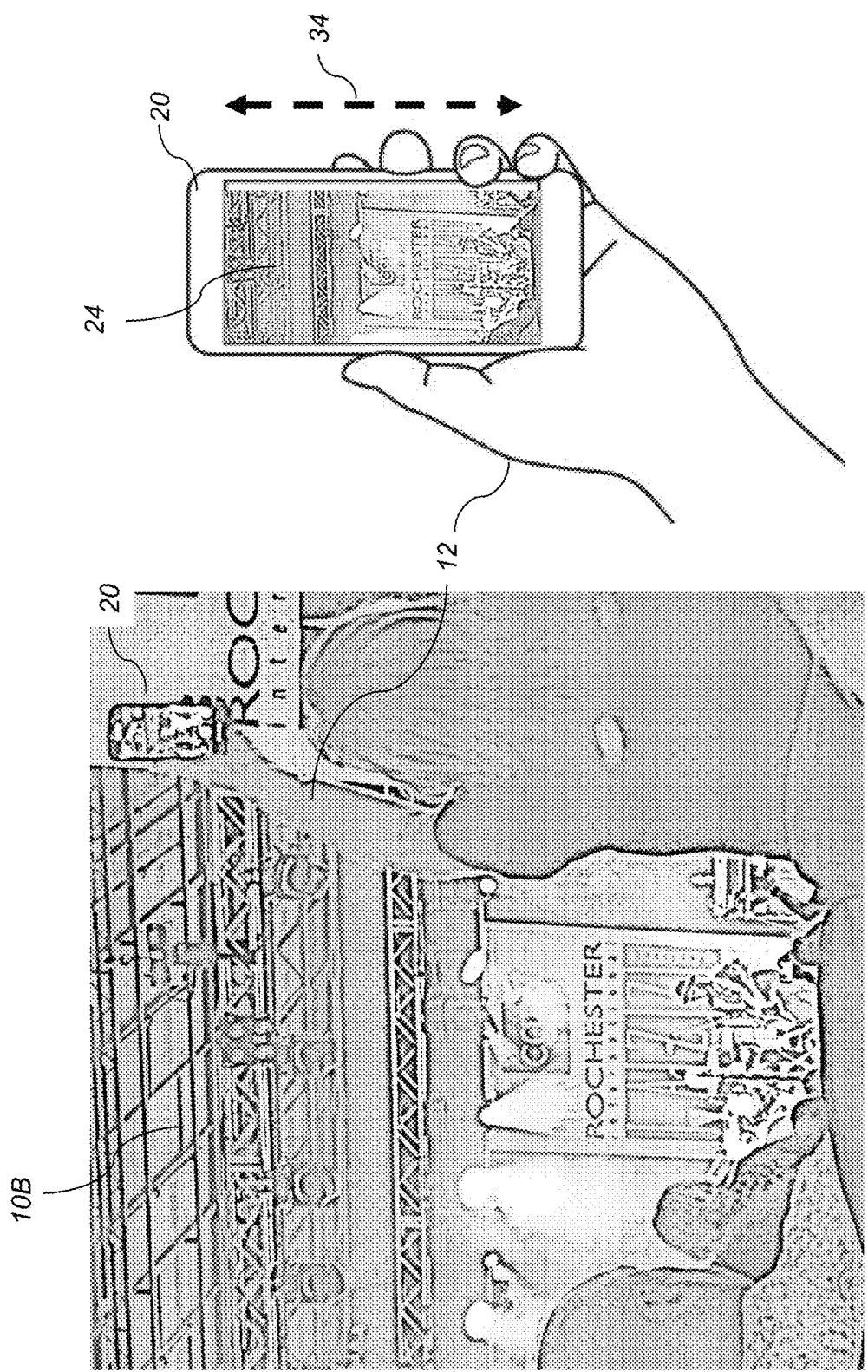
FIG. 1C illustrates a prior art smartphone in a vertical orientation recording portrait video images of a concert scene.
Figure 1D:
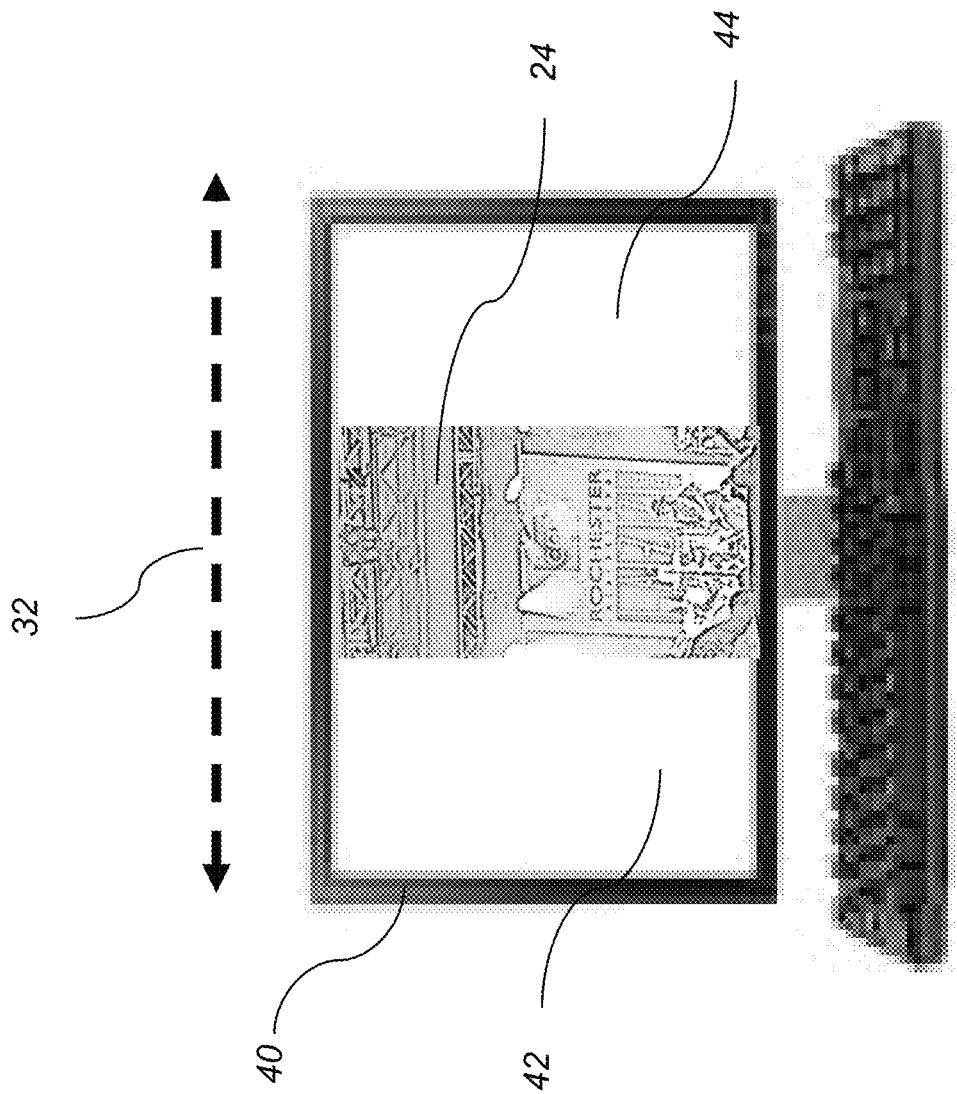
FIG. 1D illustrates a prior art computer monitor displaying portrait video images of the concert scene.

As described earlier in relation to prior art FIG. 1C, when recording a digital video of a concert scene 10B, it is common for the user's arm 12 to be held high above the other audience members while the body of the smartphone 300 is held such that the longer side of the device and display is oriented in the vertical direction 34. However, with Applicant's invention, by selecting the smartphone's "Event Mode" function, the user instructs smartphone 300 to capture and record landscape (e.g., wide screen) aspect ratio video images 22 of scene 10B, rather than portrait (e.g., narrow screen) aspect ratio images. That is, with "Event Mode," even though user's smartphone 300 is vertically oriented in the portrait aspect ratio, smartphone 300 is capturing and recording images in the landscape aspect ratio. This permits the user to capture landscape (e.g., wide screen) aspect ratio digital images of the stage in order to match the image aspect ratio of flat panel television displays and computer monitors which can later be used to display the digital images. The Event Mode function also permits the user to hold the body of smartphone 300 in a high horizontal orientation while capturing these widescreen images, so that smartphone 300 can be held in a more steady, secure, safe, and controllable manner by the user above other members of the audience, so as to reduce likelihood of blurry images and reduce the likelihood of the user dropping smartphone 300.

As illustrated in FIG. 3A, the user has selected the smartphone's Event Mode, as noted by the X adjacent to the words "Event Mode" and the O adjacent to the words "Standard Mode", as will be described in further detail with respect to FIG. 8. When Event Mode is no longer desired, the user selects the "Standard Mode" function, whereby smartphone 300 will capture and record images in the portrait aspect ratio when smartphone 300 is oriented vertically, as previously described with respect to FIG. 1C.

Figure 4:
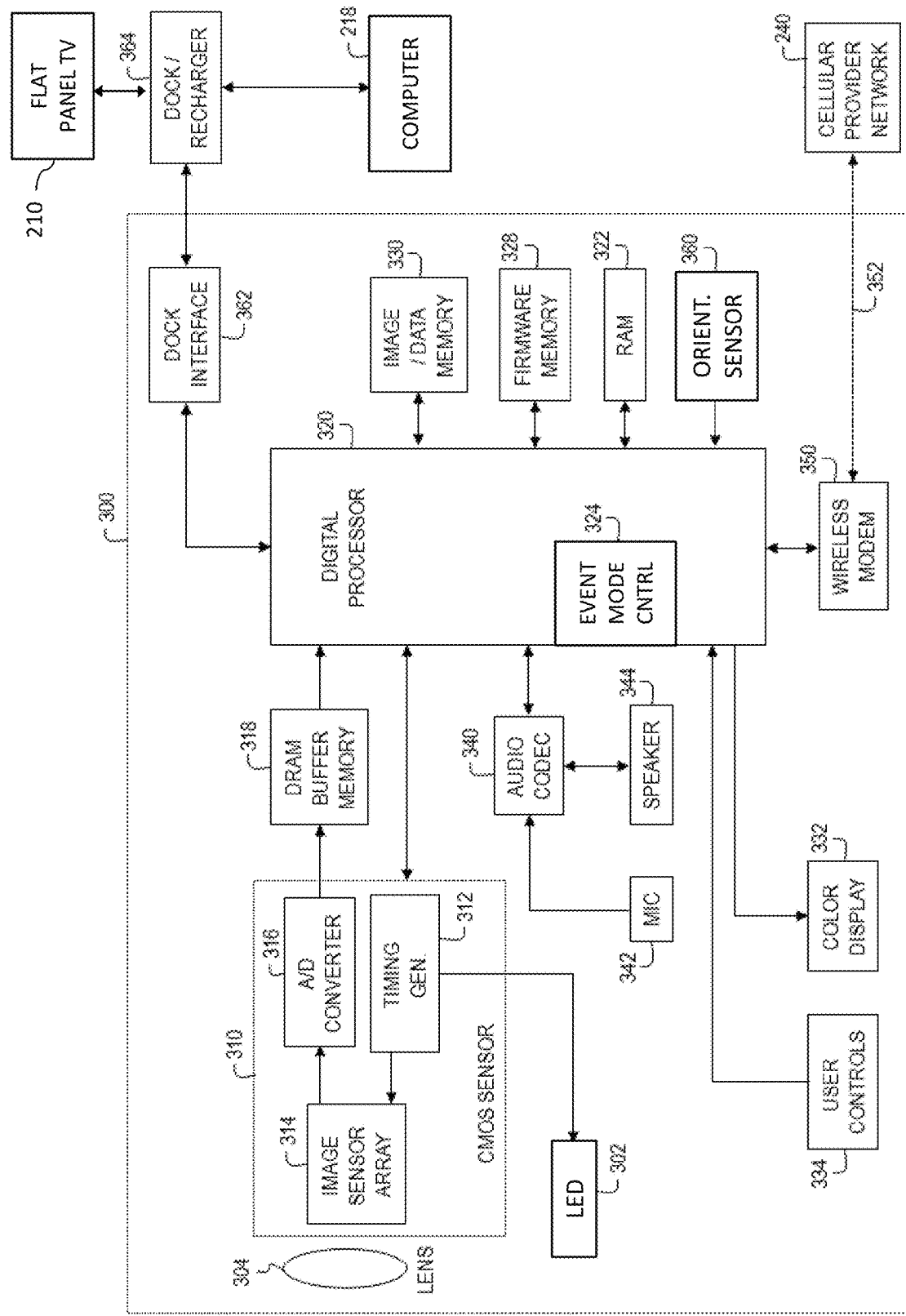
FIG. 4 is an exemplary block diagram of a smartphone, according to some embodiments of the present invention.

In some embodiments, the user may desire to initiate and terminate video recording using a record icon 335, which is one of the user controls 334 as described in FIG. 4.

Figure 3B:
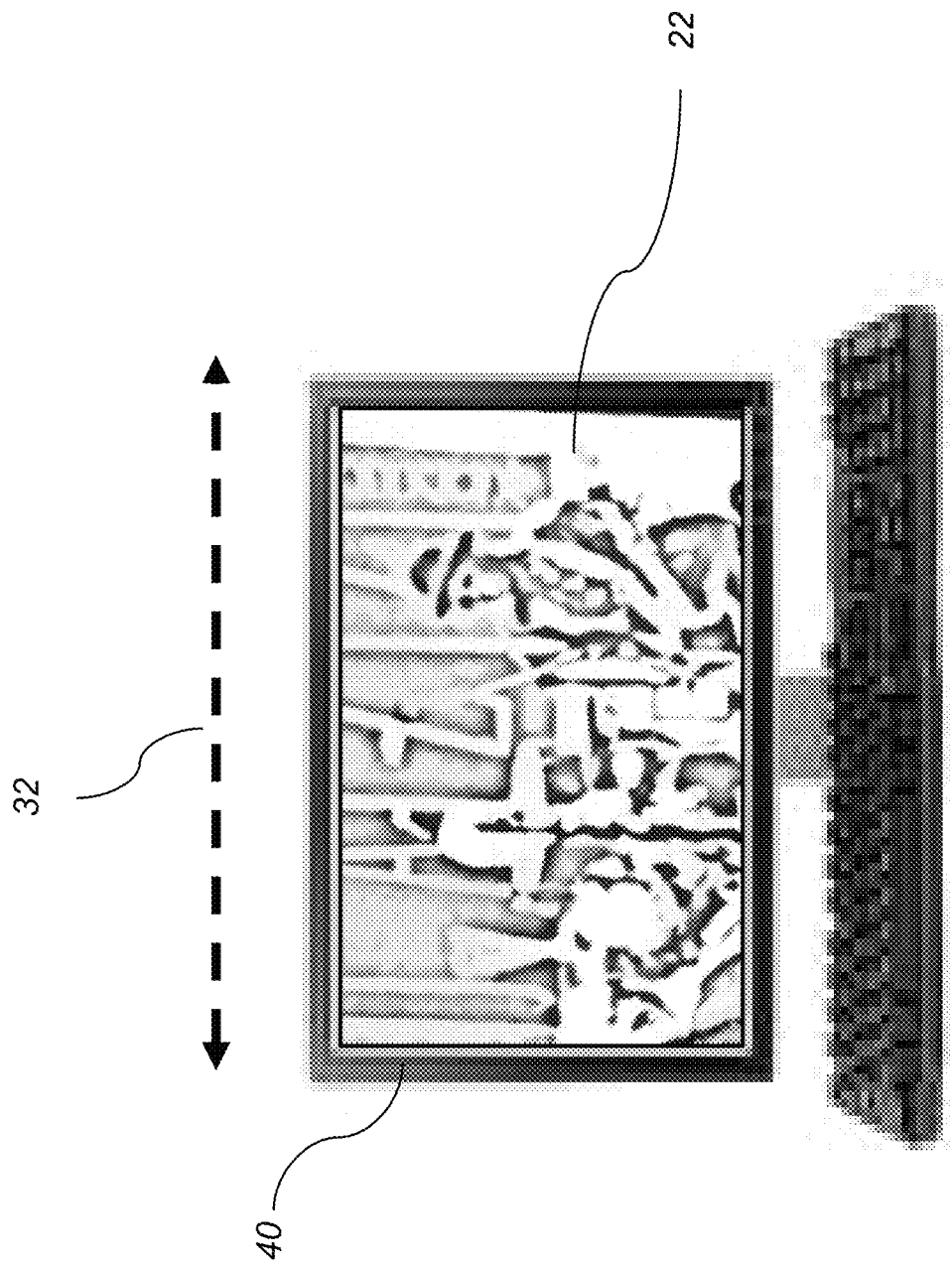
FIG. 3B illustrates a computer monitor displaying the landscape aspect ratio video images of the concert scene depicted in FIG. 3A which were captured using the event capture mode.

FIG. 3B depicts a computer monitor 40 displaying the landscape aspect ratio video images of the concert scene which were recorded using the Event Mode illustrated in FIG. 3A. When the recorded landscape aspect ratio video image 22 is displayed on the conventional wide screen computer monitor 40 or a conventional flat screen television (not shown) having the same aspect ratio, the entire screen is used to display the recorded digital images which were captured as described earlier in relation to FIG. 3A. As illustrated, the entire screen of monitor 40 can be employed to display recording 22 which as captured in Event Mode.

FIG. 4 depicts an exemplary block diagram of a smart phone 300 having an Event Mode, used in the system of FIG. 2, according to some embodiments of the present invention. It will be understood that other types of mobile devices, such as tablet computers and digital cameras and camcorders, can be used in the system described in reference to FIG. 2.

Smartphone 300 is a portable, battery-operated device, having a body which is small enough to be easily handheld by the user. Smart phone 300 can utilize an operating system such as the iOS operating system developed by Apple Inc, Sunnyvale, California, or the Android mobile platform, developed by Google, Mountain View, California. The operating system can be stored in firmware memory 328, which is a processor-accessible memory, and utilized by digital processor 320 (which may, e.g., form at least part of a data processing device system). The smart phone 300 can run applications (i.e., "apps") which are pre-installed when the smart phone is purchased, or are downloaded from the service provider 280. The digital processor 320 may use, for example, the Android software stack, which includes a Linux-based operating system, middleware, and applications. This permits additional software applications ("apps") to be downloaded from the service provider 280, stored in the firmware memory 328, and used to provide various functions, including the processes to be described later in reference to FIGS. 5-9.

The smart phone 300 includes a camera module including a lens 304 which focuses light from a scene (not shown) onto an image sensor array 314 of a CMOS image sensor 310. The image sensor array 314 can provide color image information using the well-known Bayer color filter pattern. The image sensor array 314 is controlled by timing generator 312, which also controls an LED flash 302 in order to illuminate the scene when the ambient illumination is low. The image sensor array 314 can be, for example, the OV50E image sensor available from Omnivision™ in Santa Clara, California, which is designed for smart phone applications.

The OV50E image sensor has an active array of 8224×6176 pixels, with a pixel size of 1.008 microns×1.008 microns. Images are read out using progressive scanning at programmable frame rates, up to a maximum rate of 30 frames per second for the full active 50 Megapixel array. The OV50E image sensor includes programmable binning and windowing, and can provide a range of images sizes including 1920×1080 and 1280×720 widescreen video formats. It also includes programmable mirroring and flipping, so that images can be read out in various orientations.

As a result, the smart phone 300 can capture video images by binning (i.e., summing multiple pixels of the image sensor array 314 together), and by using windowing to read out only a "region of interest" (ROI) to create HD resolution, widescreen video image frames. The video image frames are read from the image sensor array 314 at regular intervals, for example using a 30 frame per second, progressive scan readout rate.

The analog output signals from the image sensor array 314 are amplified and converted to digital data by the analog-to-digital (A/D) converter circuitry 316 in the CMOS image sensor 310, such as the 10-bit A/D converter in the OV50E image sensor. In some embodiments, the digital data is stored in a DRAM buffer memory 318 and subsequently processed by a digital processor 320 controlled by the firmware stored in firmware memory 328, which can be flash EPROM memory. The digital processor 320 produces digital images that are stored as digital image files using image/data memory 330. The phrase "digital image" or "digital image file," as used herein, refers to any digital image or digital image file, such as a digital still image or a digital video file.

The processed digital image files are stored in the image/data memory 330, along with metadata such as the date/time that the image was captured provided by the real-time clock (not shown) and location information provided by a location determination unit, such as a GPS receiver (not shown).

In some embodiments, the digital processor 320 performs color interpolation followed by color and tone correction, in order to produce rendered color image data. In some embodiments, the rendered color image data is then compressed and stored as an MPEG-4 image file in the image/data memory 330. MPEG-4 is one example of a method for compressing video images, and has been standardized internationally in ISO/IEC 14496—*Coding of audio-visual objects*. MPEG-4 is commonly used to compress audiovisual data for Internet video and broadcast television applications.

In some embodiments, the digital processor 320 also creates a continuous stream of display sized images, which are supplied to a color display 332, which can be, for example, an active-matrix LCD or organic light emitting diode (OLED) touch screen display. This allows the color display 332 to be used as a viewfinder both prior to recording (e.g., when composing a shot) as well as during recording of digital images. After captured digital images are compressed and recorded, they can also be viewed on the color display 332 by decompressing the recorded digital image file.

The graphical user interface (GUI) displayed on the color display 332 is controlled by user controls 334. The graphical user interface enables the user to control the functions of the smart phone 300, for example, to make phone calls, to launch and control apps, to capture still and video images, and to send and view text messages, email messages and videos. User controls 334 can include a touch screen overlay on the color display 332, as well as buttons, keyboard switches, rocker switches, or joysticks. In some embodiments, the user controls 334 can include voice recognition or image-based gesture recognition. In some embodiments, the user controls 334 include one or more record icons 335 which permits the user to initiate and terminate video recording, as depicted for example in FIG. 3A. In some embodiments, the user controls 334 permit the user to select an event capture mode, as will be described later with respect to FIG. 5 and FIG. 8.

An audio codec 340 connected to the digital processor 320 receives an audio signal from a microphone 342 and provides an audio signal to a speaker 344 and a headphone jack (not shown). These components can be used both for telephone conversations and to record and playback digital audio when recording digital images.

An orientation sensor 360, coupled to the digital processor 320, is used in determining the orientation of the smartphone 300. In some embodiments, the orientation sensor 360 is provided by a unit incorporating a three-axis accelerometer and a three-axis gyroscope, such as a Bosch BMI160 "inertial measurement unit" available from Bosch Sensortec GmbH, Reutlingen. Germany. The Bosch BMI160 unit includes an I²C interface which allows it to be controlled by, and provide measurements to, a digital processor such as digital processor 320 in FIG. 4. In some embodiments, these measurements can be used by the operating system (e.g., the iOS operating system) used by digital processor 320 to determine whether the smartphone 300 is currently being held in a horizontal orientation as described earlier in relation to FIG. 1A, or in a vertical orientation as described earlier in relation to FIG. 1B.

In some embodiments, a dock interface 362 is used to connect the smart phone 300 to a dock/charger 364, which is optionally connected to a flat panel TV 210 and a computer 218. The dock/recharger 364 can be used to recharge the batteries (not shown) in the smart phone 300. In some embodiments, the dock interface 362 can conform to, for example, the well-known USB interface specification. Alternatively, the dock/recharger 364 can use wireless charging. In addition, the interface between the smart phone 300 and the computer 218 or flat panel TV 210 can be a wireless interface, such as the well-known 802.11 wireless (Wi-Fi) interface.

In some embodiments, the digital processor 320 is communicatively connected to a wireless modem 350, which enables the smart phone 300 to transmit and receive information via an RF channel 352. The wireless modem 350 communicates over a radio frequency (e.g., wireless) link with the cellular provider network 240, described earlier in reference to FIG. 2, which can utilize, for example, a 4G or 5G network, or other wireless communication networks. In some embodiments, the wireless modem 350 also communicates using local area wireless interface standards, such as the well-know 802.11 (Wi-Fi) interface standards or the well-known Bluetooth standard. It will be understood that the functions of digital processor 320, because it may form at least part of a data processing device system, can be provided using a single programmable processor or by using multiple programmable processors, including one or more digital signal processor (DSP) devices. Alternatively, the digital processor 320 can be provided by custom circuitry (e.g., by one or more custom integrated circuits (ICs) designed specifically for use in smart phones), or by a combination of programmable processor(s) and custom circuits. It will be understood that communicative connections between the digital processor 320 and some or all of the various components shown in FIG. 4 can be made using a common data bus. For example, in some embodiments the connection between the digital processor 320, the DRAM buffer memory 318, the image/data memory 330, and the firmware memory 328 can be made using a common data bus.

In some embodiments, the digital processor 320 includes an event mode control 324, which can be implemented, for example, using firmware in a software application downloaded from the service provider 280 and stored in the firmware memory 328, as described earlier. In other embodiments, at least a portion of the event mode control 324 is performed by hardware incorporated into digital processor 320. In these embodiments, the event mode control 324 is used to implement at least some of the steps depicted in FIG. 5.

Figure 5:
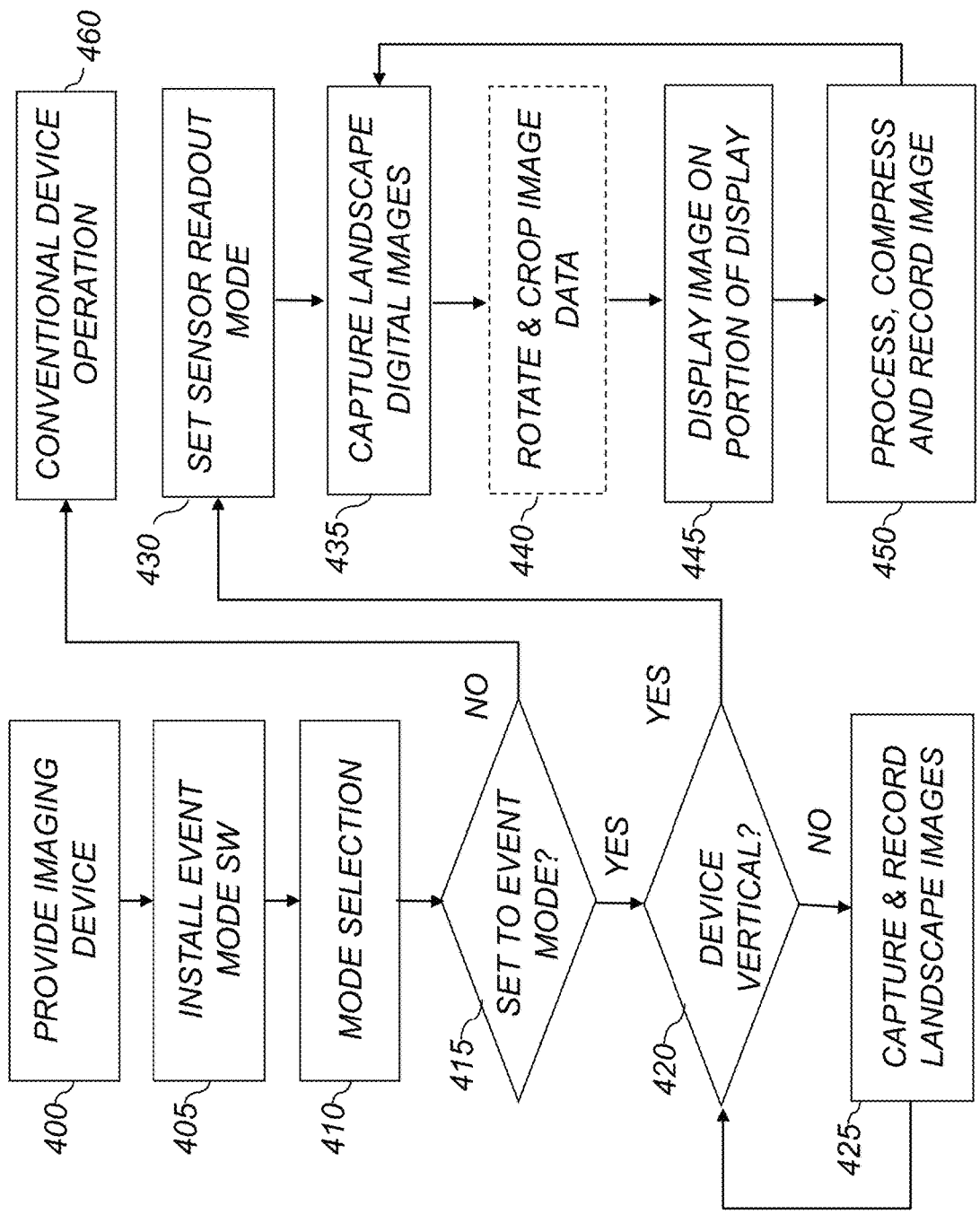
FIG. 5 is a flow diagram depicting steps for implementing an event capture mode, according to some embodiments of the present invention.

FIG. 5 is a flow diagram depicting steps for implementing an event mode, according to some embodiments of the present invention. In "provide imaging device" step 400, an imaging device, such as smartphone 300, is provided to or accessed by a user. As described earlier, the imaging device can also be a tablet computer, a digital camera, or any other type of image capture device which can be held in a vertical orientation when capturing digital images.

In "install event mode SW" step 405, event mode software is installed in the imaging device. Software installation is well known to those skilled in the art. In some embodiments, the user downloads a software application ("app") from the service provider 280 (such as the Google Play store or the Apple App store), which captures videos images (such as a "camera app") and which includes an event mode. The downloaded app can be stored in the firmware memory 328 of the smart phone 300, as described earlier in reference to FIG. 4. It will be understood that in some embodiments, the imaging device provided in step 400 already includes event mode SW which has been previously installed, so that step 405 is included in step 400.

In "mode selection" step 410, the imaging device responds to a mode selection made by a user, to either select an event mode or a conventional/standard mode of operation. For example, in some embodiments the digital processor 320 in the smartphone 300 in FIG. 4 responds to signals from user controls 334 which enable the user to select the event mode, and stores event mode selection data in image/data memory 330 which indicates that the event mode has been selected. In some embodiments, the user can also make selections to perform tracking of a particular area (e.g., a stage area where a performance is occurring) or a particular person (e.g., one of the performers on the stage) in the event mode, as will be described with respect to FIGS. 7-9.

In "set to event mode?" decision block step 415 of FIG. 5, when the user begins to use the imaging device to capture digital images, such as a digital video, the imaging device determines whether the event mode has been selected. For example, when the user selects a "camera" application and then selects "video" capture, the digital processor 320 in the smartphone 300 in FIG. 4 reads the data in image/data memory 330 that was stored in mode selection step 410 to indicate whether the event mode was selected by the user. If the event mode selection data indicates that the imaging device is not set to the event mode (i.e., decision block step 415 is "no"), then in the "conventional device operation" step 460, the imaging device operates as described earlier in relation to FIGS. 1A-1D, for conventional prior art digital imaging devices.

If the event mode selection data indicates that the imaging device has been set to the event mode (i.e., decision block step 415 is "yes"), then in the "device vertical?" decision block step 420 of FIG. 5, the imaging device uses an orientation sensor to determine whether the imaging device is being held in a vertical orientation, rather than a horizontal orientation. For example, data provided by the orientation sensor 360 in the smartphone 300, such as the Bosch BMI160 unit described earlier in reference to FIG. 4, can be used by the digital processor 320 to determine whether the smartphone 300 is being held in a vertical orientation or a horizontal orientation.

If the data provided by the orientation sensor indicates that the imaging device is not in a vertical orientation (i.e., decision block step 420 is "no"), then in step 425, the imaging device captures and records landscape images, as described earlier in relation to FIG. 1A for prior art imaging devices.

If the data provided by the orientation sensor indicates that the imaging device is in a vertical orientation (i.e., decision block step 420 is "yes"), then in step 430 the imaging device sets the sensor readout mode to capture landscape widescreen aspect ratio images using the event mode of the present invention, rather than capturing portrait mode narrow screen aspect ratio images in the conventional mode.

Figure 6:
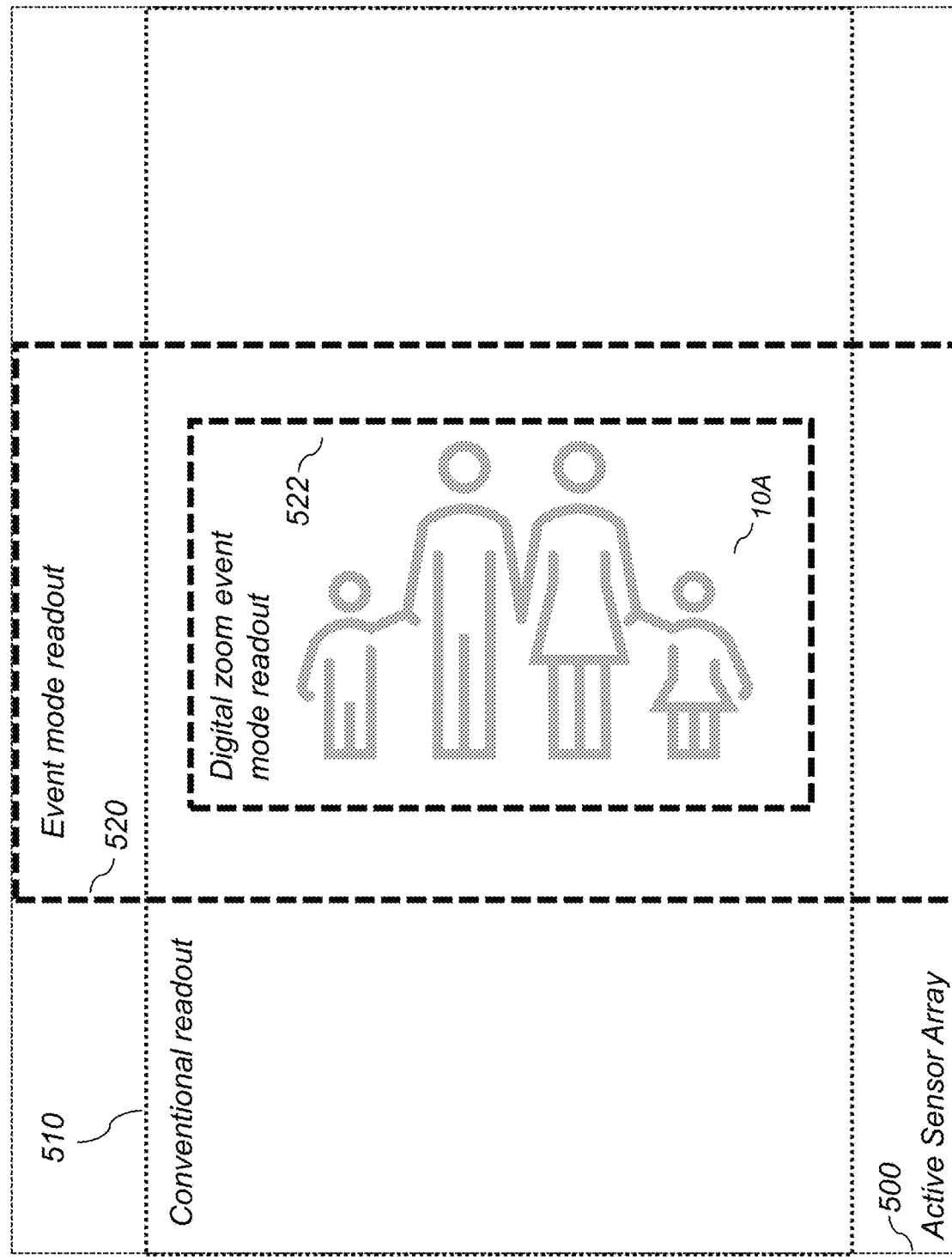
FIG. 6 depicts examples of image sensor readout in an event capture mode, according to some embodiments of the present invention.

FIG. 6 depicts examples of reading out the CMOS image sensor 310 in an event mode, according to some embodiments of the present invention. Rectangle 500 depicts the active array size of the image sensor. In some embodiments, the image sensor is the Omnivision™ OV50E image sensor, the active array size is 8224×6176 pixels, and each pixel is 1.008×1.008 microns (i.e., "square" pixels). As described earlier in reference to FIG. 4, the OV50E image sensor includes programmable binning and windowing, as well as programmable mirroring and flipping. Using these features, images from various portions of the image sensor, (as will be described below) can be read out while the body of the imaging device is held in various orientations, while providing an output image from the selected area of the image sensor which is "right side up".

If the CMOS image sensor 310 is read out in a conventional 16:9 widescreen aspect ratio video mode, as described earlier in reference to FIG. 1A and FIG. 1B, the portion of the active sensor array which is used to produce the widescreen video image is shown by the dotted conventional readout rectangle 510 in FIG. 6. In some embodiments, this is achieved by setting the image sensor readout so that only a 16:9 aspect ratio image (e.g., 8224 columns×4626 rows of pixels for the OV50E image sensor) is read out. In other embodiments, the entire active sensor array 500 is read out, but the pixels outside of (i.e., above, and below) the conventional readout rectangle 510 are discarded. Note that when the smartphone is held so that the longer side of the device body is oriented in vertical direction, as described earlier in reference to FIG. 1B, the scene 10A fills only a small portion of the conventional readout rectangle 510, corresponding to the 9:16 narrow screen aspect ratio image.

When the body of the smart phone 300 is held so that the longer side of the device is oriented in the vertical direction and the CMOS image sensor 310 is read out in the widest optical angle event mode, the portion of the active sensor array 500 which is used to produce the widescreen 16:9 aspect ratio video image is shown by the dashed event mode readout rectangle 520 in FIG. 6. In some embodiments, this is achieved by setting the image sensor readout so that only a 16:9 aspect ratio image in the shorter image sensor dimension (e.g., 6144 columns×3456 rows of pixels for the OV50E image sensor) is read out. In other embodiments, the entire active sensor array 500 is read out, but the pixels outside of (i.e., to the left and right of) the event mode readout rectangle 520 are discarded. Note that the event mode readout rectangle 520 used for capturing images with the imaging device held in a vertical orientation provides a much more appropriate image aspect ratio for the scene 10A than the dotted rectangle 510 corresponding to the conventional readout mode.

In some embodiments, the event mode includes digital zoom capability, to enlarge the center portion of the widescreen video image. The center dashed digital zoom event mode readout rectangle 522 depicts one example of digital zoom, where a smaller center portion of the active sensor array (e.g., 4096 columns×2304 rows of pixels for the OV50E image sensor) which is used to produce the zoomed widescreen 16:9 aspect ratio video image is readout. Note that the digital zoom event mode readout rectangle 522 provides an enlarged version of the scene 10A, compared to the event mode readout rectangle 520, which is used for the event mode readout with no digital zoom.

It will be understood that the digital zoom capability can have multiple digital zoom settings which can be controlled by the user, corresponding to various size readout rectangles. These readout rectangles may be smaller than digital zoom event mode readout rectangle 522, in order to provide a great degree of "zoom" (i.e., to provide greater magnification of the center of the scene), or which may be larger than digital zoom event mode readout rectangle 522 but smaller than event mode readout rectangle 520 (i.e., to provide a smaller degree of "zoom").

Referring again to FIG. 5, in "capture landscape digital images" step 435, the imaging device captures widescreen digital images using the event mode, as depicted in FIG. 3A, while the body of the imaging device (e.g., smartphone 300)

is held so that the longer side is oriented in the vertical direction 34. In other words, as the smartphone 300 is being used in the vertically oriented "portrait" position, the smartphone 300 captures and records images in the widescreen (i.e., landscape) aspect ratio. In some embodiments, 16:9 widescreen aspect ratio video images are read out of the image sensor, as described earlier in reference to FIG. 6, although other widescreen aspect ratios may be used.

In optional "rotate and crop image data" step 440 (depicted in FIG. 5 in dashed lines), if the image sensor has not already provided 16:9 widescreen (i.e., "landscape") aspect ratio digital images having the proper image area and orientation (e.g., if the image sensor has not windowed and mirrored/flipped the image as it was read out), the image data read out of the image sensor is rotated and cropped to provide 16:9 widescreen aspect ratio digital images. This processing can be performed using frame store memories which subsample, window, mirror, and/or rotate the images from the image sensor, as described for example in U.S. Pat. No. 5,138,454 "Megapixel video previewer frame store and display" to Parulski and U.S. Pat. No. 5,410,415 "Recorded digital image presentation control files" to Parulski, et. al., the disclosures of both are incorporated in their entirety by reference herein.

Still referring to FIG. 5, in "display image on portion of display" step 445, the digital images currently being captured in the event mode are displayed in the proper orientation on a display of the imaging device. In some embodiments, as described earlier in reference to FIG. 3A, the widescreen digital images 22 can be displayed on the smartphone 300 while they are being recorded. In some embodiments, the widescreen digital images being recorded are displayed along with an adjacent image area which is not being recorded, as will be described in reference to FIG. 9.

In "process, compress and record image" step 450, the imaging device processes and optionally compresses the widescreen digital images (e.g., using MPEG-4 compression) and records the digital images in a digital memory, as described earlier in reference to FIG. 4. It will be understood that the digital memory, such as image/data memory 330 in FIG. 4, can be implemented using many different memory technologies, including internal Flash EPROM memory, removable memory cards, magnetic media, and optical media.

Figure 7:
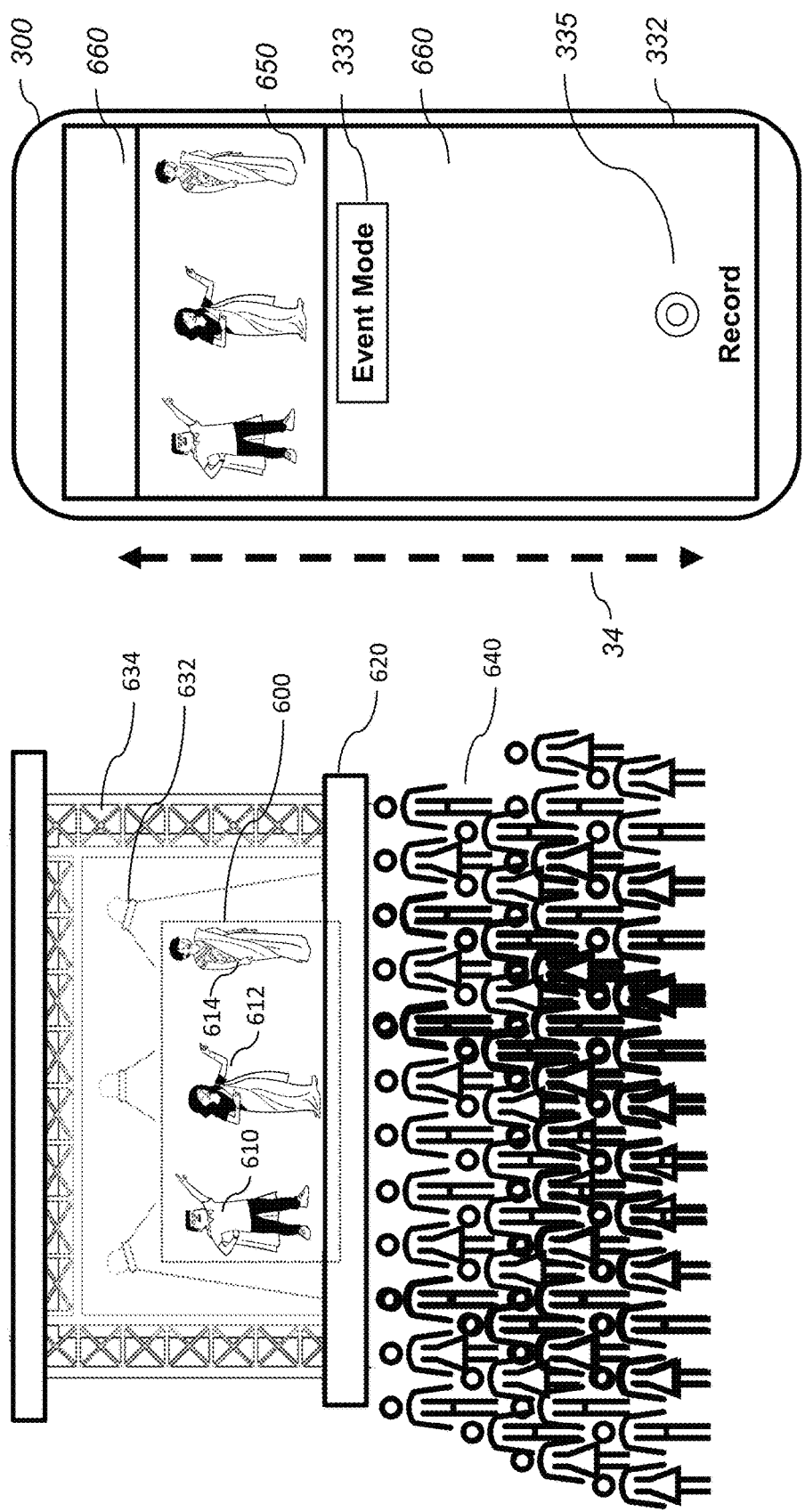
FIG. 7 depicts an example of the use of object tracking in a "stage center" event capture mode, according to some embodiments of the present invention.

FIG. 7 depicts an exemplary smartphone 300 operating in a "center stage" event mode which further utilizes multiple object tracking to capture and record landscape aspect ratio video images of multiple performers on a stage while the longer side of the body of smartphone 300 is oriented in the vertical direction 34. In the "center stage" event mode, object tracking is employed in order to determine the stage area and to automatically set the digital zoom level and sensor readout area to capture only the stage area being used for the performance. For example, in some embodiments the zoom level and sensor readout area can be set to produce widescreen video images of only the stage area 600, which includes performers 610, 612, and 614, and a portion of the stage floor 620, but does not include the sides of the stage 634, the stage lights 632, or the audience 640.

As shown in FIG. 7, the display 332 of the smartphone 300 displays a "bounding area window" 650, which corresponds to the widescreen video images being recorded in the event mode (i.e., widescreen images of the stage area 600). Other areas 660 of the display 332, which are normally used to display a portrait aspect ratio images in conventional camera applications on smartphones when held vertically, are not used for image display in this event mode, since they are outside of the area of the widescreen video image being captured. The display 332 can display an "event mode" icon 333, which can be used to confirm that "event mode" has been selected and/or used to access an event mode settings menu that will be described with respect to FIG. 8.

The user can initiate and terminate video recording in the event mode using the record icon 335, which is one of the user controls 334, as described in FIG. 4.

Still referring to FIG. 7, in some embodiments, multiple people on stage can be tracked, and the "bounding area" for the stage area being used for the performance can be determined as described, for example, by Shinfeng Lin, Tingyu Chang, and Wensheng Chen in their paper titled "Multiple Object Tracking using YOLO-based Detector", which was published in the Journal of Imaging Science and Technology, July-August 2021, on pages 40401-1 through 40401-9, and which is available at https://doi.org/10.2352/J.ImagingSci.Technol.2021.65.4.040401, incorporated herein by reference in its entirety. In such embodiments, the widescreen aspect ratio bounding area window 650, corresponding to the stage area being used for the performance, can be determined by calculating a widescreen aspect ratio rectangle which includes each of the bounding boxes determined for each of the performers on the stage. Only the pixels on the image sensor corresponding to this "bounding area" are used to produce the widescreen video images of the stage area 600, which are displayed in bounding window area 650 and are recorded by the imaging device, such as the smartphone 300 in FIG. 4.

In some embodiments, the smartphone 300 operates in a "track performer" mode, where a particular performer is identified by the user (e.g., by tapping on the person's face as an event mode video is captured). The position of the identified user can then be tracked, for example as described by Yigit Akbay and Mihai Mitrea in their paper titled "Face detection and recognition in organic video: A comparative study for sport celebrities database", which was published in the Proceedings of the International Symposium on Electronic Imaging 2022, Image Processing: Algorithms and Systems XX, on pages 355-1 through 355-6, and which is available at https://doi.org/10.2352/EI.2022.34.10.IPAS-355, incorporated herein by reference in its entirety.

In such embodiments, the multiple object tracking is set to prioritize the selected performer (e.g., the user's child in a school play), and the "bounding area" used to produce the widescreen video images of the stage area 600 which are recorded by the imaging device is determined such that the selected performer is positioned towards the center of the bounding area, if possible.

As depicted in FIG. 7, in some embodiments the imaging device, such as smartphone 300, displays widescreen video images on a widescreen display window 650 of the color display 332. The user can initiate and terminate video recording using record icon 335, which is one of the user controls 334 as described in FIG. 4.

Figure 8:
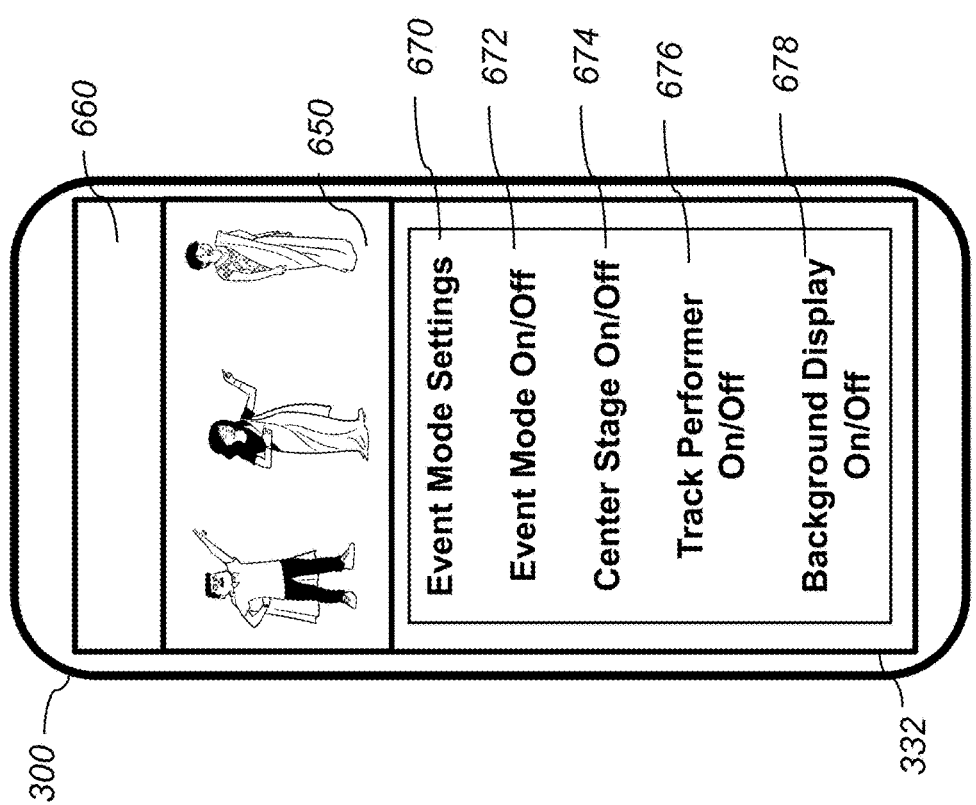
FIG. 8 depicts an example user interface screen showing selection of event capture mode settings, according to some embodiments of the present invention.

FIG. 8 depicts an example user interface screen displayed on color display 332 of smartphone 300 which permits a user to adjust one or more event mode settings 670, according to some embodiments of the present invention. The event mode settings 670 can include an "event mode" user control 672, which permits the user to turn on the event mode, or to turn off the event mode so that the smartphone 300 operates as described earlier in relation to FIGS. 1A-1D. The event mode settings 670 can also include a "center stage" user control 674 and a "tracker performer" user control 676, which permit the user to select or deselect these particular types of event modes, which were described in relation to FIG. 7. The event mode settings 670 can further include a "background display" user control 678, which will be described in relation to FIG. 9.

It will be understood that in some embodiments, the user can adjust event mode settings using other user interface technologies, including buttons, keyboards, joysticks, voice recognition or image-based gesture recognition, as described earlier in relation to FIG. 4.

Figure 9:
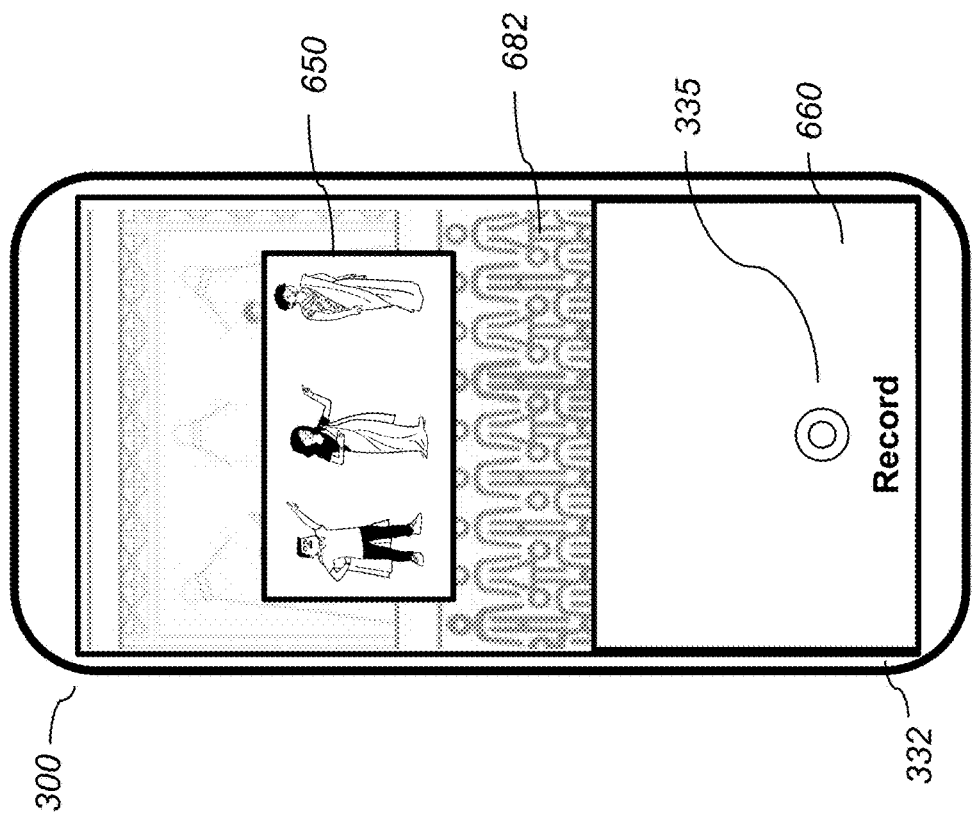
FIG. 9 depicts an example user interface screen in a "full display" event capture mode, according to some embodiments of the present invention.

FIG. 9 depicts an example user interface screen in a "background display" event mode, according to some embodiments of the present invention. The background display mode permits the user of the imaging device to view at least a background portion 682 of the active area of the image sensor which is outside of the bounding area window 650 corresponding to the widescreen video images being recorded in the event mode. This permits the user, for example, to ensure that the smartphone 300 is being pointed/directed at the stage in a manner that allows the entire stage area to be captured and processed in order to determine a suitable bounding area.

In some embodiments, the background portion 682 is displayed at a lower contrast level than the bounding area window 650, in order for the user of the smartphone 300 to easily distinguish between the two. In some embodiments, the size of the background portion 682 can be adjusted by the user, for example using an event mode setting.

In some embodiments, the portion of the image of the scene corresponding to the displayed background portion 682 is processed by the imaging device (e.g., by digital processor 320 in FIG. 4) to provide a different visual appearance than the portion of the image of the scene which is displayed in the bounding area window 650. This processing may provide, for example, a different (e.g., lower) contrast or brightness level for the background portion, or may provide a different color appearance (e.g., convert a color image to monochrome) for the background portion, or may modify (e.g., reduce) the sharpness or resolution of the background portion. These and other modifications which provide a different visual appearance to an image are known to those skilled in the art. Modifying the visual appearance of the portion of the image of the scene corresponding to the displayed background portion 682 (e.g., using a lower contrast level than for the bounding area window 650), permits the user of the smartphone 300 to more easily distinguish between the background portion 682 which is not recorded, and the bounding area window 650, which is recorded, in order to properly compose images as they are recorded. In some embodiments, the size of the background portion 682 can be adjusted by the user, for example using an additional event mode setting.

It will be understood that in the background display mode, the portion of the image area read from the image sensor includes not only the area corresponding to the bounding area window 650, which is used to record the event mode video, but also includes at least some of the pixels of the adjacent areas of the image sensor which correspond to the background portion 682. In some embodiments, the resolution of the image area read out from the image sensor used for the background portion 682 is set to be lower than the resolution of the image area read out from the image sensor inside the bounding area window 650. This is because the pixels corresponding to the bounding area window 650 will normally be recorded as a high-definition widescreen video, while the pixels corresponding to the background portion 682 will only be displayed on the color display 332 as part of the viewfinder display, as the widescreen video is being recorded. For example, in some embodiments each pixel of the image sensor within the bounding area window 650 may be read out to produce the high-definition widescreen video, while only every $4^{th}$ group of color pixels horizontally and vertically which correspond to the background portion 682 may be read out.

Applicants note that although in the above description, the event mode can be selectively enabled by the user (e.g., using "event mode" user control 672 in FIG. 8), in some embodiments this user control is not required. For example, in some embodiments the event mode software installed as described in step 405 of FIG. 5 can be designed specifically to capture event mode images. In this example, the user would use this event mode app only to capture event mode images, with their imaging device (e.g., smartphone 300) held such that the longer side of the smartphone's display is oriented in a vertical direction 34. To capture conventional images, the user would instead use a separate conventional camera app.

Applicants note that although in the above description, a 16:9 aspect ratio is often used as an example of a widescreen aspect ratio, other aspect ratios (which are longer in the horizontal direction than in the vertical direction) may be used instead. Other such aspect ratios are known to those skilled in the art. These include aspect ratios which are less than 16:9, such as a 4:3 "conventional TV" aspect ratio, and aspect ratios which are greater than 16:9, such as a 2.35:1 "cinemascope" aspect ratio.

As described above, with the digital image capture device as disclosed in this disclosure, the digital image recorded using the event mode can be a widescreen aspect ratio video image, and the imaging component outputs only those pixels corresponding to the widescreen aspect ratio video image.

As described above, with a digital image capture device having a display, the digital image recorded using the event mode can be displayed on the display as a widescreen aspect ratio video image and recorded using a processor-accessible memory.

As described above, the digital image capture device can comprise at least one user interface setting that, when selected by the user, instructs the processor to determine a stage area. The least one user interface setting can be configured to instruct the processor to determine a center stage area and automatically set a digital zoom level and sensor readout area to capture the center stage area.

As described above, the digital image capture device can comprise at least one user interface setting configured to instruct the processor to track a user-identified performer.

As described above, the digital image capture device can comprise a user interface setting allowing a user to simultaneously view a first viewing area and a second viewing area adjacent the first viewing area, a first portion of the image from the imaging component displayed in the first viewing area is recorded by the image capture device, and a second portion of the image from the imaging component displayed in the second viewing area is not recorded by the image capture device.

As described in this disclosure, a user interface setting can allow a user to simultaneously view a first viewing area and a second viewing area adjacent the first viewing area, wherein a first portion of the image from the imaging component displayed in the first viewing area is recorded by the image capture device, and a second portion of the image from the imaging component displayed in the second viewing area is not recorded by the image capture device.

As described in this disclosure, the first portion of the image from the imaging component displayed in the first viewing area can have a different visual appearance than the second portion of the image from the imaging component displayed in the second viewing area.

As described in this disclosure, at least one user interface setting can be configured to instruct the processor to determine a center stage area and automatically set a digital zoom level and sensor readout area to capture the center stage area.

Applicants note that references throughout this disclosure to "one embodiment" or "an embodiment" or "an example embodiment" or "an illustrated embodiment" or "a particular embodiment" and the like means that a particular feature, structure, or characteristic described in connection with the embodiment is included in at least one embodiment. Thus, the appearances of the phrases "in one embodiment" or "in an embodiment" or "in an example embodiment" or "in this illustrated embodiment" or "in this particular embodiment" and the like in various places throughout this specification are not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more, and the word "subset" is intended to mean a set having the same or fewer elements of those present in the subset's parent or superset.

Further, the phrase "at least" is used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least upon A' includes A as well as the possibility of one or more other additional elements besides A. In the same manner, the phrase, 'based upon A' includes A, as well as the possibility of one or more other additional elements besides A. However, the phrase, 'based only upon A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The term "program" in this disclosure should be interpreted as a set of instructions or modules that may be executed by one or more components in a system, such as a controller system or data processing device system, in order to cause the system to perform one or more operations. The set of instructions or modules may be stored by any kind of memory device, such as those described with respect to FIG. 2 and FIG. 4. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). The word "module" may be defined as a set of instructions.

The word "device" and the phrase "device system" both are intended to include one or more physical devices or sub-devices (e.g., pieces of equipment) that interact to perform one or more functions, regardless of whether such devices or sub-devices are located within a same housing or different housings. In this regard, the word "device" may equivalently be referred to as a "device system".

Further, the phrase "in response to" may be used in this disclosure. For example, this phrase might be used in the following context, where an event A occurs in response to the occurrence of an event B. In this regard, such phrase includes, for example, that at least the occurrence of the event B causes or triggers the event A.

In addition, the phrase "data processing device system" may be used in this disclosure. A data processing device system includes one or more data processing devices, such as digital processor 320 in FIG. 4, that implement or execute, in conjunction with other devices, such as those in image capture device 300, methods of various embodiments of the present disclosure, including the example methods of FIG. 5 described herein. Each of the phrases "data processing device", "data processor", "processor", and "computer" and the like is intended to include any data processing device, such as a central processing unit ("CPU"), a desktop computer, a laptop computer, a mainframe computer, a tablet computer such as an iPad™, a personal digital assistant, a cellular phone, a mobile device, a smart phone, or any other device for processing data, managing data, or handling data, whether implemented with electrical, magnetic, optical, biological components, or otherwise. In this regard, while some embodiments of the present disclosure are described herein in the context of one or more mobile devices, such as a smart phone, the disclosure is not so limited, and any other data processing device system may be used instead of or in addition to a mobile device.

In addition, the phrase "processor-accessible memory device system" may be used in this disclosure. The processor-accessible memory device system includes one or more processor-accessible memory devices, such as firmware memory 328 in FIG. 4, configured to store program instructions and other information, including the information and program instructions needed by a data processing device system to execute the methods of various embodiments, including the example methods of FIG. 5 described herein. In this regard, each of the steps illustrated in the example methods of FIG. 5 may represent program instructions stored in the processor-accessible memory device system and configured to cause a data processing device system to execute the respective step. The processor-accessible memory device system may be a distributed processor-accessible memory device system including multiple processor-accessible memory devices communicatively connected to the data processing device system via a plurality of computers and/or devices. On the other hand, the processor-accessible memory device system need not be a distributed processor-accessible memory system and, consequently, may include one or more processor-accessible memory devices located within a single data processing device.

Each of the phrases "processor-accessible memory", "processor-accessible memory device", and the like is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, EEPROMs, and RAMs. In some embodiments, each of the phrases "processor-accessible memory" and "processor-accessible memory device" is intended to include or be a processor-accessible (or computer-readable) data storage medium. In some embodiments, each of the phrases "processor-accessible memory" and "processor-accessible memory device" is intended to include or be a non-transitory processor-accessible (or computer-readable) data storage medium. In some embodiments, the memory device system may be considered to include or be a non-transitory processor-accessible (or computer-readable) data storage medium system. And, in some embodiments, the memory device system may be considered to include or be a non-transitory processor-accessible (or computer-readable) storage medium system.

In addition, the phrase "data input-output device system" may be used in this disclosure. The data input-output device system, such as user controls 334 in FIG. 4, may include a touch screen, a voice recognition unit, a mouse, a keyboard, a computer, a processor-accessible memory device, a network-interface-card or network-interface circuitry, or any device or combination of devices from which a desired selection, desired information, instructions, or any other data is input to the data processing device system. The data input-output device system may include a user-activatable control system that is responsive to a user action. The data input-output device system may include any suitable interface for receiving a selection, information, instructions, or any other data from other devices or systems described in various ones of the embodiments.

The data input-output device system also may include an image generating device system such as CMOS sensor 310 in FIG. 4, a display device system such as color display 332 in FIG. 4, an audio generating device system such as audio codec 340 and speaker 334 in FIG. 4, an audio transducer such as microphone 342 in FIG. 4, a computer, a processor-accessible memory device, a network-interface-card or network-interface circuitry, or any device or combination of devices to which information, instructions, or any other data is output by the data processing device system. The input-output device system may include any suitable interface for outputting information, instructions, or data to other devices and systems described in various ones of the embodiments. If the input-output device system includes a processor-accessible memory device, such memory device may or may not form part or all of the memory device system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory device system may be shown separately from the data processing device system and the data input-output device system, one skilled in the art will appreciate that the processor-accessible memory device system may be located completely or partially within the data processing device system or the data input-output device system.

Further still, the data processing device system, the data input-output device system, and the processor-accessible memory device system may be located entirely within the same device or housing or may be separately located, but communicatively connected, among different devices or housings. In the case where the data processing device system, the data input-output device system, and the processor-accessible memory device system are located within the same device, they may be implemented using one or more application-specific integrated circuits (ASICs) in some embodiments.

In the foregoing detailed description, the methods and apparatuses of the present disclosure have been described with reference to specific exemplary embodiments thereof. It will, however, be evident that various modifications and changes can be made thereto without departing from the broader scope of the present invention. The present specification and figures are accordingly to be regarded as illustrative rather than restrictive.

A computer program product can include one or more non-transitory storage mediums, for example; magnetic storage media such as magnetic disk (such as a floppy disk) or magnetic tape; optical storage media such as optical disk, optical tape, or machine readable bar code; solid-state electronic storage devices such as random access memory (RAM), flash EPROM memory, or read-only memory (ROM); or any other physical device or media employed to store a computer program having instructions for controlling one or more computers to practice any of the methods according to any embodiment of the present disclosure.

What is claimed is:

1. A digital image capture device configured to record a digital image, comprising:
    a body having an imaging component and an orientation sensor, the body being orientable by a user between at least a horizontal orientation and a vertical orientation;
    a user interface having a user-selectable mode switchable between (i) a standard mode which produces a digital image having an aspect ratio corresponding to the device orientation and (ii) an event mode which produces a digital image of a center stage area; and
    a processor coupled to the orientation sensor to determine the orientation of the body, and coupled to the user interface to determine the user-selectable mode, wherein
    (a) when the capture device is in the standard mode, the processor activates the imaging component to record the digital image in a landscape aspect ratio when the body is determined to be in the horizontal orientation and in a portrait aspect ratio when the body is determined to be in the vertical orientation; and
    (b) when the capture device is in the event mode, the processor activates the imaging component to record the digital image in a landscape aspect ratio when the body is determined to be in the vertical orientation, and the processor uses image data captured by the imaging component to determine an image area corresponding to the center stage area and sets the imaging component to record only the image area corresponding to the center stage area in the landscape aspect ratio.

2. The digital image capture device of claim 1, wherein the digital image recorded using the event mode is a widescreen aspect ratio video image, and the imaging component outputs only those pixels corresponding to the widescreen aspect ratio video image.

3. The digital image capture device of claim 1, further comprising a display, wherein the digital image recorded using the event mode is displayed on the display as a widescreen aspect ratio video image and recorded using a processor-accessible memory.

4. The digital image capture device of claim 1, further comprising at least one user interface setting that, when selected by the user, instructs the processor to determine the center stage area where a performance is occurring involving multiple performers.

5. The digital image capture device of claim 1, wherein the processor automatically sets a digital zoom level and sensor readout area to capture only the image area corresponding to the center stage area where a performance is occurring involving multiple performers.

6. The digital image capture device of claim 5, further comprising at least one user interface setting configured to instruct the processor to track a user-identified performer.

7. The digital image capture device of claim 5, further comprising a user interface setting allowing a user to simultaneously view the center stage area and an adjacent viewing area adjacent the center stage area, wherein a first portion of the image from the imaging component displayed in the center stage area is recorded by the image capture device, and a second portion of the image from the imaging component displayed in the adjacent viewing area is not recorded by the image capture device.

8. The digital image capture device of claim 7, wherein the first portion of the image from the imaging component displayed in the center stage area has a different visual appearance than the second portion of the image from the imaging component displayed in the adjacent viewing area.

9. The digital image capture device of claim 8 wherein the different visual appearance can include one or more of the following: different contrast, different brightness, different color, different sharpness, and different resolution.

10. A method of recording a digital image using an image capture device, the image capture device having a body and a processor coupled to an imaging component and an orientation sensor, the body being orientable by a user between at least a horizontal orientation and a vertical orientation, the method comprising:
providing a user interface coupled to the processor having first and second user-selectable switchable modes, the first mode producing a digital image having an aspect ratio corresponding to the device orientation and the second mode producing a digital image of a center stage area;
using the orientation sensor, determining the orientation of the body;
responsive to the user selecting the first mode, instructing the imaging component to record the digital image (a) in a landscape aspect ratio when the body is determined to be in the horizontal orientation and (b) in a portrait aspect ratio when the body is determined to be in the vertical orientation; and
responsive to the user selecting the second mode, instructing the processor to use image data captured by the imaging component to determine an image area corresponding to the center stage area and set the imaging component to record only the digital image area corresponding to the center stage area in a landscape aspect ratio when the body is determined to be in the vertical orientation.

11. The method of claim 10, wherein the digital image recorded using the second mode is a widescreen aspect ratio video image, and the imaging component outputs only those pixels corresponding to the widescreen aspect ratio video image.

12. The method of claim 10, wherein the image capture device further comprises a display, wherein the digital image recorded using the second mode is displayed on the display as a widescreen aspect ratio video image and recorded using a processor-accessible memory.

13. The method of claim 10, wherein the image capture device further comprises at least one user interface setting that, when selected by the user, instructs the processor to determine, using the image data captured by the imaging component, the center stage area where a performance is occurring involving multiple performers.

14. The method of claim 10, wherein the processor determines the center stage area where a performance is occurring involving multiple performers, and automatically sets a digital zoom level and sensor readout area to capture only the image area corresponding to the center stage area.

15. The method of claim 14, wherein the image capture device comprises at least one user interface setting configured to instruct the processor to track a user-identified performer.

16. The method of claim 10, wherein the image capture device comprises a user interface setting allowing a user to simultaneously view a first viewing area and a second viewing area adjacent the first viewing area, a first portion of the image from the imaging component displayed in the first viewing area is recorded by the image capture device, and a second portion of the image from the imaging component displayed in the second viewing area is not recorded by the image capture device.

17. A tangible storage medium for storing instructions readable by a processor in an image capture device having a body and a processor coupled to an imaging component, an orientation sensor, and a touch screen display, the body being orientable by a user between at least a horizontal orientation and a vertical orientation, which when executed by the processor enables the image capture device to:
provide a user interface on the touch screen display having first and second user-selectable switchable modes, the first mode producing a digital image having an aspect ratio corresponding to the device orientation and the second mode producing a digital image of a center stage area;
use the orientation sensor to determine the orientation of the body;
responsive to the user selecting the first mode, instruct the imaging component to record the digital image (a) in a landscape aspect ratio when the body is determined to be in the horizontal orientation and (b) in a portrait aspect ratio when the body is determined to be in the vertical orientation; and
responsive to the user selecting the second mode, instruct the imaging component to determine an image area corresponding to the center stage area using image data captured by the imaging component and set the imaging component to record only the image area corresponding to the center stage area in a landscape aspect ratio when the body is determined to be in the vertical orientation.

18. The tangible storage medium of claim 17, further comprising providing instructions which enable a user interface setting of the image capture device to allow a user to simultaneously view a first viewing area and a second viewing area adjacent the first viewing area, wherein a first portion of the image from the imaging component displayed in the first viewing area is recorded by the image capture device, and a second portion of the image from the imaging component displayed in the second viewing area is not recorded by the image capture device.

19. The tangible storage medium of claim 18, wherein the first portion of the image from the imaging component displayed in the first viewing area has a different visual appearance than the second portion of the image from the imaging component displayed in the second viewing area.

20. The tangible storage medium of claim 17, further comprising instructions which enable at least one user interface setting of the image capture to automatically set a digital zoom level and sensor readout area to capture the center stage area where a performance is occurring involving multiple performers.

* * * * *